INVENTOR.
BY

Feb. 25, 1964  H. CHAPUIS ETAL  3,121,989
DOUBLE TWIST CABLING APPARATUS
Original Filed Oct. 5, 1959  10 Sheets-Sheet 5

INVENTOR.

BY

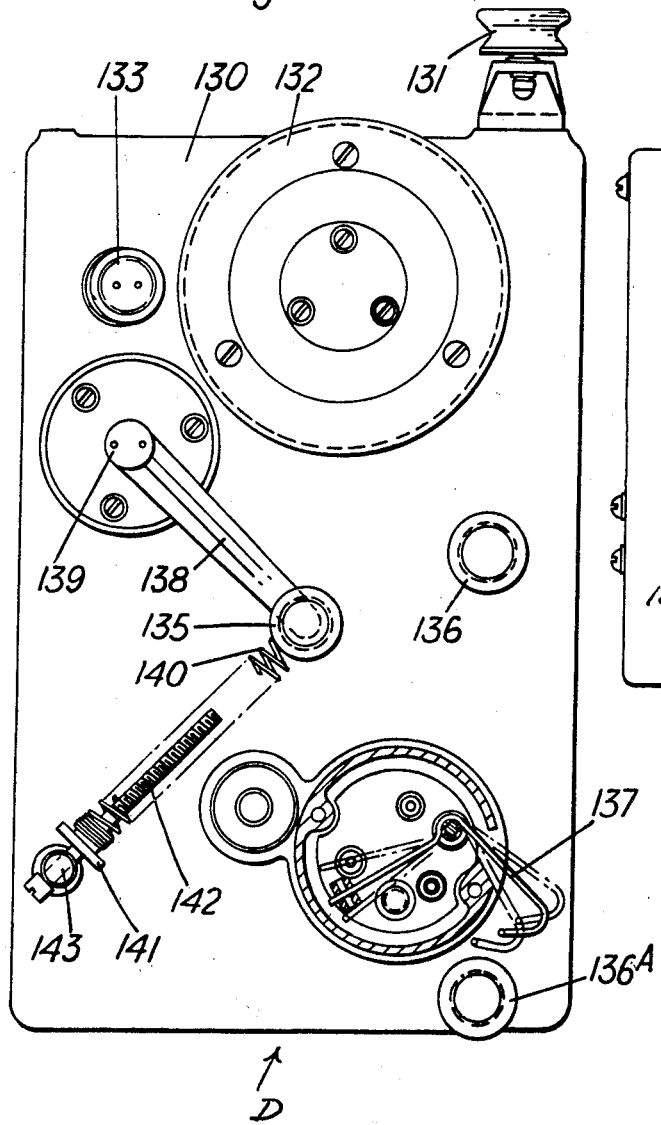
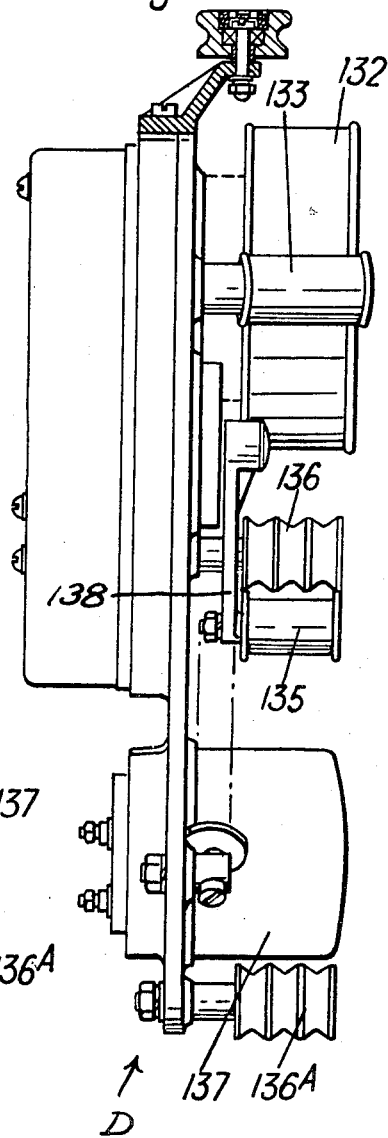

Feb. 25, 1964

H. CHAPUIS ETAL 3,121,989

DOUBLE TWIST CABLING APPARATUS

Original Filed Oct. 5, 1959

INVENTOR.

BY

Feb. 25, 1964    H. CHAPUIS ETAL    3,121,989
DOUBLE TWIST CABLING APPARATUS
Original Filed Oct. 5, 1959    10 Sheets-Sheet 9

INVENTOR.
BY

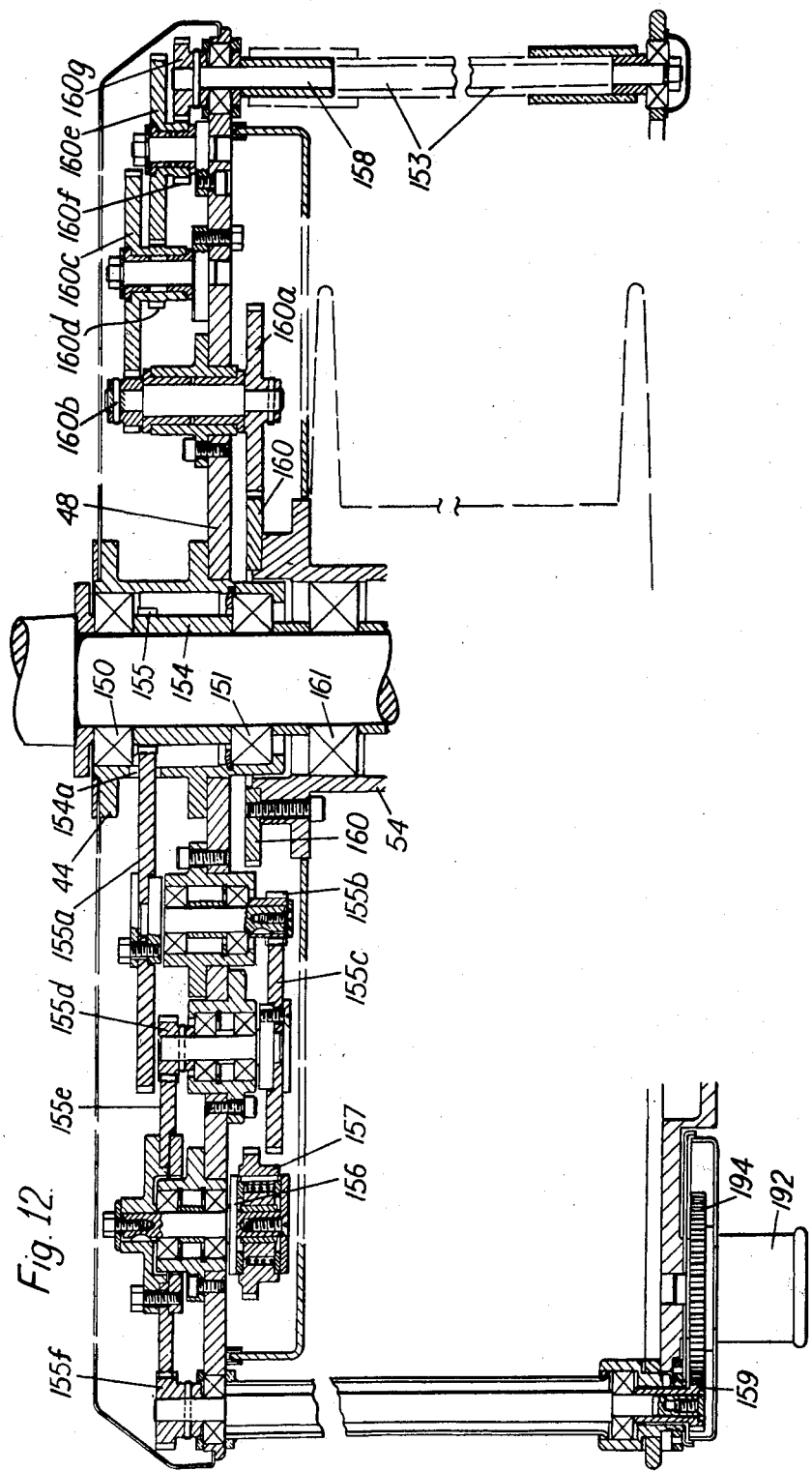

United States Patent Office

3,121,989
Patented Feb. 25, 1964

3,121,989
DOUBLE TWIST CABLING APPARATUS
Henri Chapuis, Eugene Colombu, Paul Granger, and Paul Marie Pierrat, Paris, France, assignors to Textile and Chemical Research Company, Limited, Guernsey, Channel Islands, Great Britain, a corporation of Great Britain
Application Jan. 31, 1961, Ser. No. 86,054, which is a division of application Ser. No. 844,345, Oct. 5, 1959. Divided and this application Mar. 28, 1962, Ser. No. 183,117
Claims priority, application France Oct. 6, 1958
4 Claims. (Cl. 57—58.83)

One of the most important outlets for textiles, notably for artificial and synthetic textiles, is in cabled yarns for the reinforcement of pneumatic tires, belts and other articles of rubber. Cabled yarns are obtained by a process identical with that long employed for cotton. A first twist is imparted to the filaments, a strand is formed with a plurality of these filaments by imparting an inverse twist, and if desired a number of strands are assembled, the strands being untwisted.

In the case of artificial and synthetic textiles, coarse yarns of 840, 1650 or 2200 deniers are generally employed, and the production of the cabled yarns then comprises only the first two twisting phases.

These twisting phases have for a long time been carried out successively, that is to say, in a first operation the twist was imparted to the filaments, for example on mills, twisting frames, etc., and the ends were thereafter cabled on other machines of the same type. It is also known to use, both for twisting and for cabling, double-twist devices which impart at least two twists per revolution of the spindle, and double-twist devices are known in which the double twist is imparted at the unwinding of the supply bobbin, as also devices operating at the take-up.

Known double-twist spindles include those in which a temporary twist is imparted to one core end, which is enveloped by an end twisted with a double twist. This type of spindle lends itself only to two-ply cabling, while the combined devices mentioned in the preceding paragraph permit of cabling several ends.

The present invention relates to an improved combined apparatus comprising spindles producing a double twist at the take-off, and a double-twist spindle for the cabling.

This application is a division of copending application Serial No. 86,054 filed January 31, 1961 which in turn is a division of Serial No. 844,345, filed October 5, 1959, now abandoned.

An object of the invention is to provide apparatus capable of producing cabled yarns of optimum quality, with equipment of maximum simplicity and of minimum overall dimensions which ensures a minimum working cost.

The conditions of optimum quality of cabled yarns are essentially:

(1) The use of large packages;
(2) Effective control of the tensions of the ends and of the wound-on cabled yarn and uniformity of the tensions from one end to the other;
(3) Ready individual adjustment of the speeds of the spindles and therefore of the twists;
(4) Absence of harmful tension on the end and on the cabled yarn;
(5) Automatic stopping of the device in the event of breakage of an end; and
(6) Production of regular wound packages at winding on.

The conditions in regard to simplicity of the equipment are essentially:

(1) Ready attachment of the ends;
(2) Ready access to the movable elements and simple removal of the latter;
(3) Direct control of the various spindles by a single belt; and
(4) Rapid removal of the empty bobbins from the unwinding spindles and of the wound bobbin.

The conditions regarding overall dimensions are essentially:

Minimum occupied surface and access to all elements at convenient height.

The conditions in regard to minimum cost are essentially:

Minimum shut-down time; frame of minimum weight; and minimum power requirements per kilograms of thread.

The apparatus according to the present invention satisfies all of these conditions.

It comprises essentially in each unit (A) a reinforced frame consisting of tubular constructional elements or perforated angle-irons, a plurality of double-twist unwinding spindles (B) of the type in which the cage is held fast by gravity, special guides (C) for the external balloon of each of the spindles (B), a delivery element (D) for the uniform association of the ends and a special guide (E) similar to the guides (C) for the external balloon of the double twist winding-on spindle (F).

The invention will be more readily understood with reference to the embodiment illustrated by way of example in the accompanying drawings.

In the drawings:

FIG. 7 is a partial front elevation showing the delivery element;

FIG. 8 is a partial side elevation of the delivery element with the parts in section;

FIG. 12 is a diagrammatic expanded plan view of the gearing.

The drawings illustrate an embodiment of the invention with three unwinding spindles and a take-up spindle and thus adapted for the manufacture of three-ply cabled yarns. It is to be noted that it is usual to impart during the cabling a twist opposite to that of the twisted ends, the effect of which is to untwist the ends in the cabling. The invention permits of producing any combination of twists either with a cabling twist which may be equal to or smaller or greater than the twist imparted to the ends. The twisting of the individual ends could also be equal or different, but is normally equal. As an example, the initial yarn may be of 1650 deniers with 70 S turns per meter, and 400 additional turns are imparted during the twisting. In the cabling, a Z twist of 470 turns per meter is imparted. This gives a so-called compensated cabled yarn.

Figure 1:
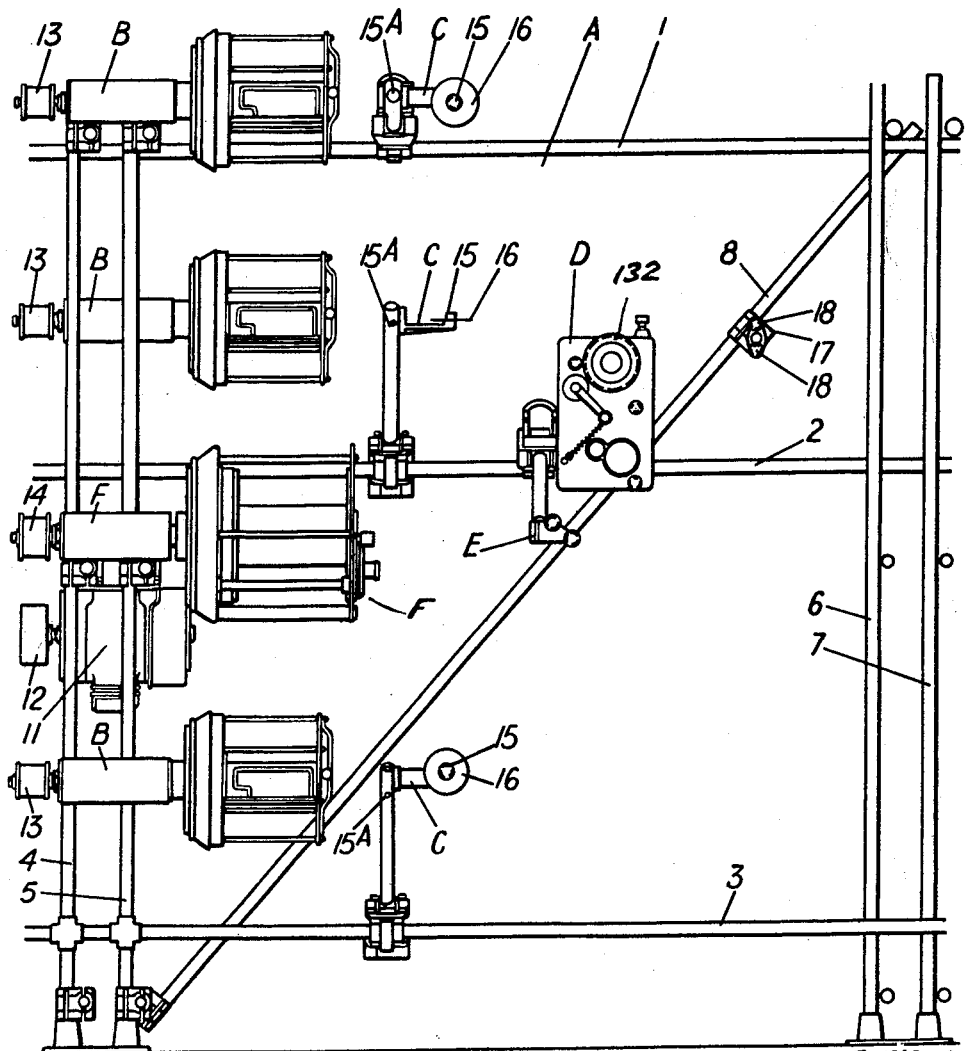
FIG. 1 is a diagrammatic front element of a unit according to the invention.

In FIG. 1, the frame A consists entirely of metal tubes, of which tubes 1, 2, 3, 4, 5, 6, 7 and 8 can be seen. These tubes are assembled by well known means, as for example, double clamps such as those shown at the bottom left hand corner of the drawing. The oblique tube 8 is an element intended to increase the rigidity. Another oblique tube (not shown), crossing at 90°, is provided at the rear of the frame. The uprights 4, 5, 6, 7 etc. can be mounted on small pedestals which may comprise resilient base plates.

The frame carries a motor 11 provided with a pulley 12, three unwinding spindles B and take-up spindle F. The three unwinding spindles B each supports a pulley 13, while the take-up spindle supports a pulley 14. The motor 11 drives the three spindles B and the spindle F through a single belt passing over the pulleys 13 and 14 along a sinuous path. The axes of the three spindles B and of the spindle F are appropriately off-set in the horizontal direction to render unnecessary the use of idler pulleys. Since the three spindles B are identical, only one will hereinafter be described in detail.

As is known in the case of double-twist unwinding spindles, the thread is first unwound from a package on a bobbin centered on a shaft. This bobbin is held fast by gravity. The withdrawn thread thereafter enters the bore of the shaft, from which it issues radially and forms an external balloon on its way to an axial guide. The guide (C) associated with each spindle (B) is mounted on a retractable support. The analogous guide (E) associated with the spindle (F) is mounted in the same way. The ends twisted by the three spindles (B), having passed over the guides (C), then pass over the guide rollers 15, each of which is associated with a cheek 16, while they converge towards a guide 17 comprising three rollers 18 of which two are shown, are returned to the delivery element (D), converge towards the balloon guide (E), similar to the device (C), and are cabled as they are wound on to the bobbin mounted on the spindle (F). In this very schematic description of the apparatus as a whole and of its operation, all detail has been omitted, and the description of the electric control with its accessories has also been omitted since it is not essential for an understanding of the invention.

Figure 2:
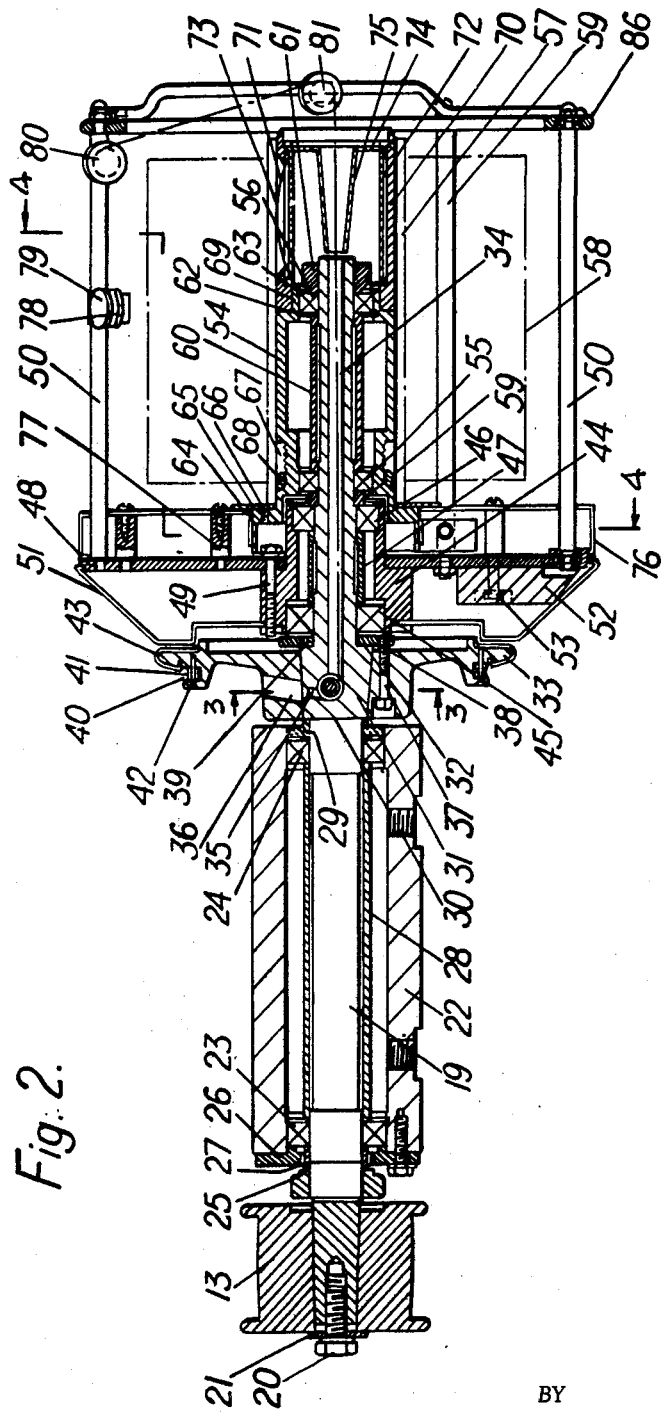
FIG. 2 is a sectional view on an enlarged scale of a take-off spindle.

According to FIG. 2, the three unwinding spindles (B) comprise:

A shaft 19 having mounted on its end a driving pulley, previously designated by 13, for the rotational drive. This pulley is conically bored and is fitted on the frusto-conical end of the shaft 19 and locked thereon by means of a screw 20, the head of which bears against a washer 21. The shaft is carried in a fixed bearing 22 with the aid of two ball bearings 23 and 24. These bearings are maintained in position by the usual keying elements 25, 26, 27, 28, 29, against the shoulder 30 on the shaft 19. That portion of the said shaft which emerges from the bearing 22 is axially bored at 34 and comprises externally, first a frusto-conical portion 31 and then a cylindrical portion of smaller diameter, these two portions adjoining one another at a shoulder 32. Fitted on the frusto-conical portion is a profiled circular pate 33.

The axial bore 34 leads into a transverse bore extending across the portion 31. A hole 35 formed obliquely in the shaft (see description of FIG. 3) leads to an orifice 36 in the plate 33. The latter is locked in position on the frusto-conical portion 31 by means of screws 37 screwed into the collar 38 bearing against the shoulder 32. The relative position of the plate 33 on the shaft 19 is ensured by a pin 39. Thus, the plate 33 is fast with the shaft 19. The rim of the plate 33 is formed with a groove 40 to receive a ring of small rollers 41 axially mounted on small pins 42. On its periphery, the said rim is protected by a crimped ring 43 having a smooth sliding surface.

On the external cylindrical portion in prolongation of the frusto-conical portion 31, the shaft 19 supports a casing 44 with the aid of two bearings 45 and 46 spaced by an intermediate sleeve 47. The casing 44 is fast with a circular plate 48 fixedly mounted on the casing by screws 49. The plate 48 serves as a support for an axial cage formed of six parallel bars 50. These bars are joined at the far end. The rear of the plate 48 serves for centering and supporting a housing 51 of frusto-conical form which is seated on the casing 44.

The plate 48 and the elements secured thereto are held stationary when the shaft 19 is rotating by the counterweight 52 maintained in position against the plate by the screws 53. The circular plate 33 forms with the housing 51 a deflecting means and reduces the free clearance, thereby preventing the introduction of threads or thread waste between them. On the cylindrical portion on the delivery side of the casing 44, the shaft 19 supports a profiled sleeve 54 with the aid of two bearings 55 and 56 for the mounting of a tube 57 supporting a thread package 58 to be unwound and twisted. The elements 59, 60, 62 and 63 are intended for keying the bearings 55, 56 maintained axially on the shaft 19 by the nut 61.

Figure 4:
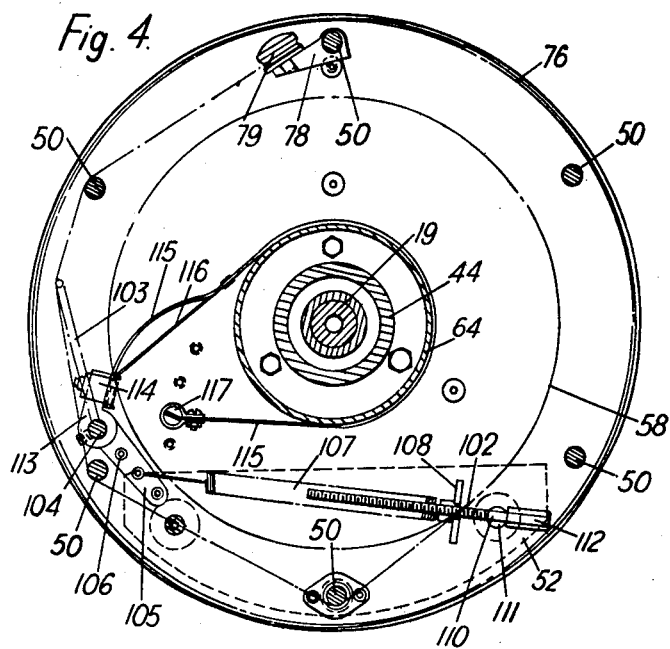
FIG. 4 is a transverse section taken along the line 4—4 of FIG. 2 on a much larger scale.

The profiled sleeve 54 terminates at the rear in a rim 64 serving as a brake drum (description of FIG. 4). Fixedly mounted on this rim 64 is the other side of a bearing washer 65 for the tube 57. The fixing screws 66 are countersunk.

In addition, the profiled sleeve 54 is formed externally with a groove 67 having a fluted base, in which there is disposed a resilient ring 68 of circular cross-section. When the tube 57 supporting the wound package is engaged on the sleeve 54, it very slightly flattens the ring 68 and causes it to turn on itself by virtue of the flutings, in order to follow this displacement. The relative positions are such that the ring 68 exerts a thrust on the tube 57 in order to maintain it in contact when the latter has abutted the washer 65.

The sleeve 54 has at its forward end a cut-away portion 69 which serves to receive an extension sleeve 70 formed with three apertures 71 situated 120° apart, and enclosing an inner sleeve 72 cut-away in its center part. Three leaf springs 73 (only one of which is shown) are engaged in the apertures 71 and bear on a cut-away portion of the sleeve 72. The latter is maintained by the flange 74 of a funnel-shaped member 75, which is in turn maintained by a split metal ring fitted within a groove formed for this purpose in the sleeve 70.

In order to prevent the introduction of threads or thread waste which would impair the action of the braking device on the rim of the flange 64, the latter is protected by a casing 76 which is supported by studs 77 screwed into the plate 48. Fixedly mounted on one of the bars 50 is a small support 78 on which is mounted a loose roller 79 approximately two-thirds along the length from the plate 48. Further to the front, there is mounted another support for another loose guide roller 80. In addition, the front rim 86 of the bar cage supports a retractable cross member on which is mounted a small support which in turn carries a third loose guide roller 81. The object of this assembly will hereinafter be dealt with in the description of FIG. 5.

Figure 3:
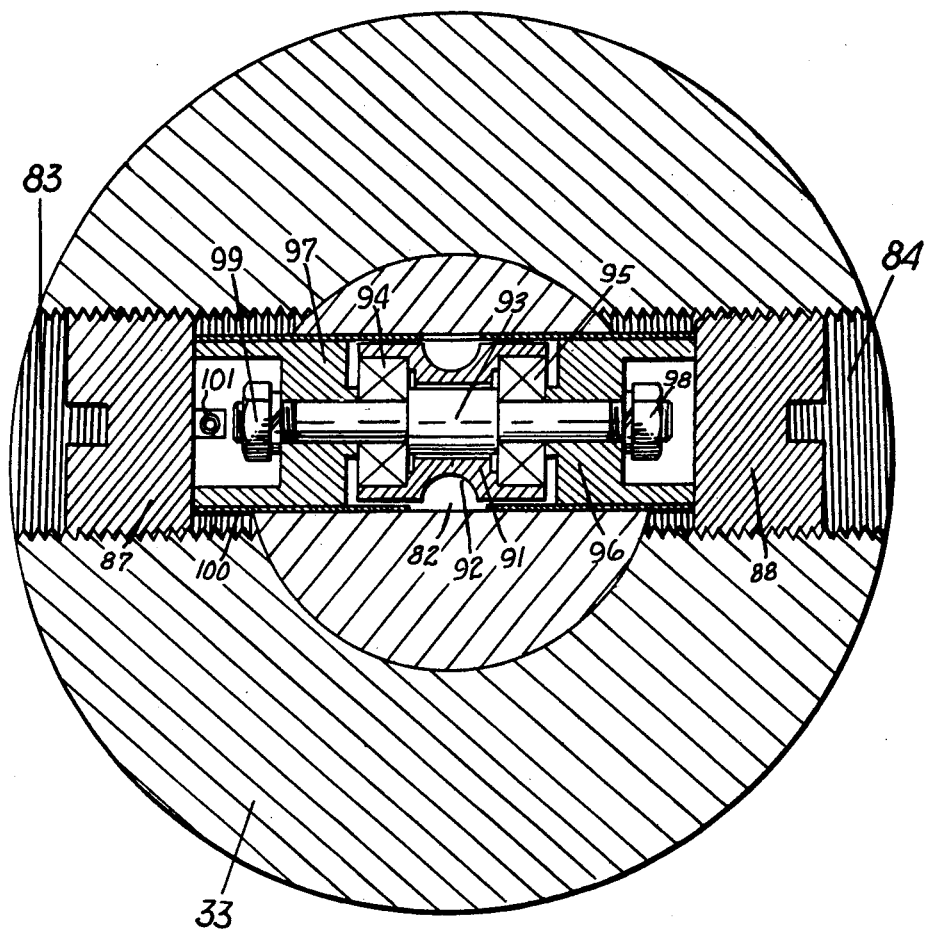
FIG. 3 is a transverse detailed section of the hub member taken along the line 3—3 of FIG. 2 on a much larger scale.

It has been stated in the foregoing that the axial bore 34 in the shaft 19 communicates with an oblique hole 35, both extending into a common transverse bore, FIG. 3, which shows on a larger scale a transverse section along the line 3—3 in FIG. 2, and explains the object of the said transverse bore 82 extending across the frusto-conical portion 31 of the shaft 19. The said bore 82, by reason of the positioning of the plate 33 in relation to the shaft 19, is coaxial with a transverse bore formed in the hub of the plate 33, the two ends of which are screw threaded at 83 and 84.

Mounted in the bore 82 is a cylindrical cartridge consisting of a central roller 91 with a groove 92 maintained by means of two bearings 94 and 95 on a pin 93. The two bearings are maintained in position on either side of the central shouldered portion of the pin 93 by two recessed plugs 96 and 97 fixed by the nuts 98, 99 on the screw threaded ends of the pin 93. The whole element thus described, fitted in a sleeve 100 having a window and a small flap in its central portion, constitutes the removable cartridge. The flap closes, without friction, the groove 92 in that part through which the thread does not pass. A transverse pin 101 prevents rotation of the cartridge thus formed and serves also as an abutment for the axial positioning, so that the groove 92 in the roller 91 is situated in the diametral plane of the spindle. The said cartridge is maintained axially in position by the plugs 87, 88 screwed in to the bores 83, 84 by way of the plate 33. The bore 82 is so formed that the axis of the shaft 19 is tangential to the base of the groove 92 in the roller 91. The object of this cartridge is to form a guide means, which is readily accessible for the purpose of cleaning, for the thread traveling from the axial passage 34 in the shaft 19 towards the oblique outlet passage 35.

It will be seen that, by reason of the previously described arrangements, the assembly comprising the sleeve 54, the tube 57 and its package 58 can also turn independently of the rotation of the shaft 19 and of the plate 33 connected thereto. This relative rotation permits the unwinding of the package. It will also be noted under the same conditions that the plate 48 remains stationary by reason of its pendulum-like mounting. In order to obtain a tension on the unwound thread, it is necessary to brake the rotation of the sleeve 54.

The description of FIG. 4 is intended to explain the device relative thereto. This figure is a transverse section along the line 4—4 of FIG. 2 and therefore in two successive planes, as indicated by the arrow.

In the drawing there are six bars 50 constituting the cage, one of which carries the support 78 of the first guide roller 79, and the casing 76. There is also shown a section of the rim 64, of the casing 44 and of the shaft 19. The dotted circle represents the package 58. There is also shown at 52 the counterweight for holding fast the plate 48. The thread leaves the surface of the laterally unwound package at 102 and passes over three bars 50. The first of these bars 50 encountered by the thread is mounted loose to avoid variations in tension which might occur between the beginning and the end of the package on a fixed bar as a result of the variations of the arc of contact. Between the second and third bars encountered by the thread, the latter comes into contact with the arm of the feeler 103. The latter forms part of a bell crank lever rocking on the pivot 104. The other arm 105 of the bell crank lever is formed with holes 106 for the engagement of one end of a spring 107. There are three holes for three different tension ranges of the spring.

The spring 107 is attached at one end to a nut 108 bearing on the plate 48 and incapable of turning. The said nut is mounted on a screw threaded rod extending through a pivot 111 at its cylindrical portion 110 and bearing on the pivot at its hexagonal head 112. In turning, the said head 112 displaces the nut 108 and thus varies the tension of the spring, whereby the force with which the thread bears on the feeler 103 forming part of the bell crank lever 105 is adjusted, but in addition the said bell crank lever 105 is secured to a lug 113, to which there is attached by means of a locking collar 114 one end of the brake belt 115, the other end of which is attached to a fixed stud 117 after passing over the rim 64. When the tension of the thread increases, the feeler 103 pivots to the right and the braking action of the rim 64 will be reduced, so that the package will be less retarded in its rotation and the tension of the thread will be brought to the desired value. Since the belt 115 is not extensible and is therefore likely to cause considerable variations in the braking action with small movements of the feeler, an elastic portion 116 has been provided to regularize the braking conditions.

Figure 5:
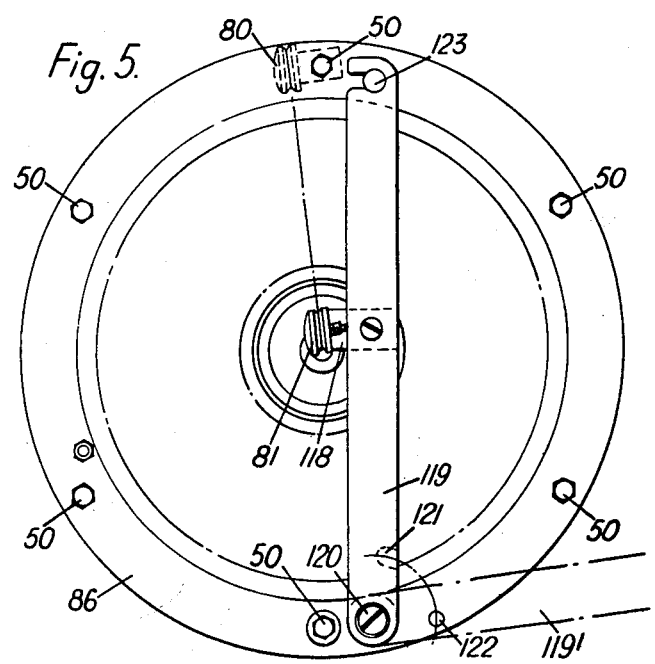
FIG. 5 is a front elevation of a take-off spindle.

FIG. 5 which is a front view of an unwinding spindle B, shows the front rim 86 adjoining the six bars 50, the securing nuts of which can be seen. The second guide roller 80 is situated behind the rim 86 and is indicated in dotted lines. The third guide roller 81, is shown. The latter is mounted on its support 118 secured with a cross member 119, which is retractable for the replacement of the tubes 57. For this purpose, the cross member 119 is rotatably mounted on a pivot 120. The cross member 119 is shown at 119', in dotted lines, in the retracted position. It may be formed with a slot 121 which engages a pin 122 in the latter position. In addition, the cross member 119 comprises a locking pin 123 engaging a stud in the active position of the roller 81.

In the operation of unwinding spindle B, the thread is unwound from the package, the rotation of which is braked as a function of the tension of the thread. The thread pulled from the package passes out of the cage formed by the bars 50 over a number of bars (and over the feeler of the braking system), and then over the first guide roller 79 and over the second guide roller 80 (FIG. 2) and thereafter passes through the hollow portion of the rim 86 (FIG. 5) towards the third guide roller 81, from which it enters the funnel 75 and thereafter axially enters the bore 34 in the shaft 19. The thread returned by the central roller 91 of the cartridge receives its first twist between the rollers 81 and 91. From the latter, it travels through the oblique hole 35 and issues radially through the orifice 36 in the hub of the plate 33. It travels over a portion of the ring of rollers 41 before unwinding axially over the smooth ring 43, from which it forms a loop and receives a second twist in travelling towards the corresponding loop stop guide C, which will now be described.

Figure 6:
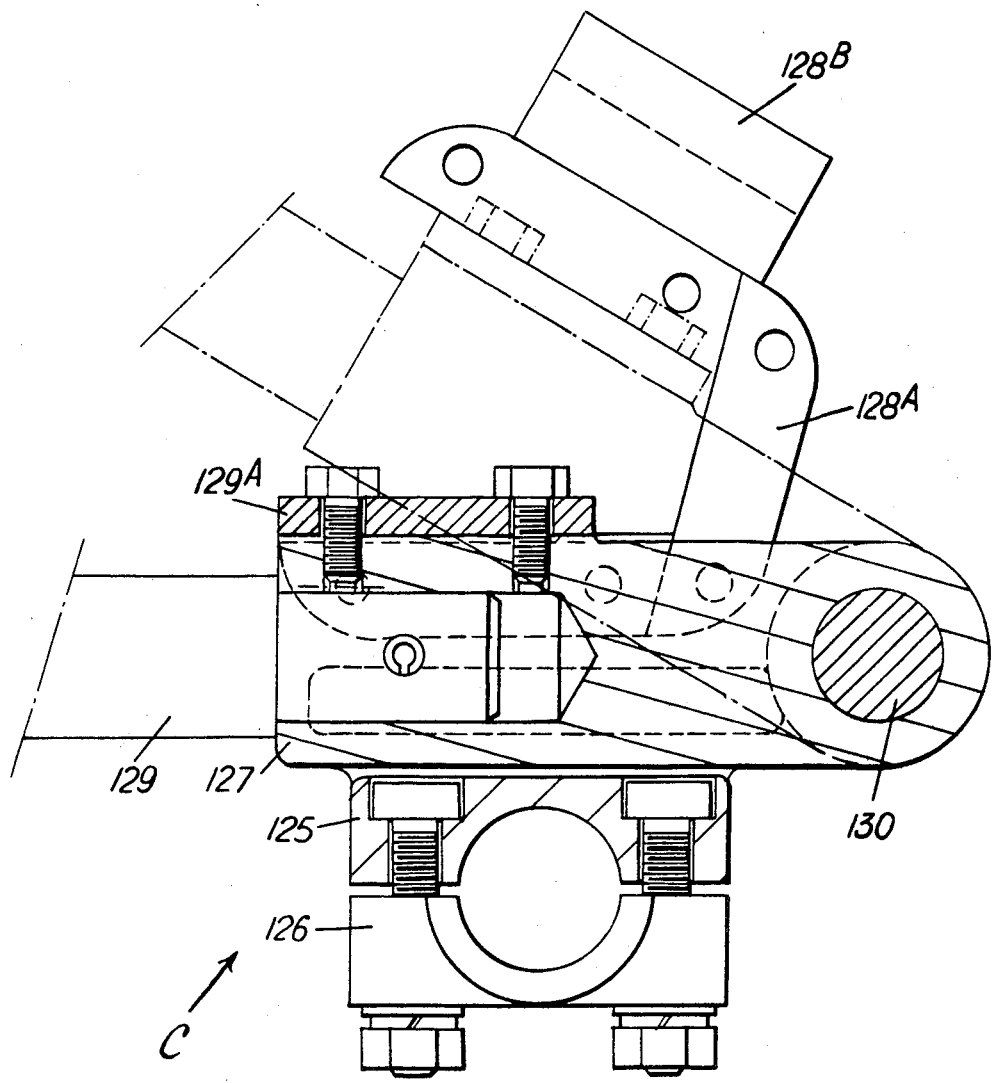
FIG. 6 is a detail view showing the mounting of the guides.

The guides C and the guide E of FIG. 1 are formed of a retractable support arm adapted to take up two fixed positions with a change in position by a pivoting action. Each guide comprises on its outlet side an eye 15A, which is the loop stop guide proper and is directed in the axial position along the axis of the corresponding spindle B. The small eye 15A is followed by a roller 15, to which there is juxtaposed a rear disc 16 serving for the ready positioning of the thread. FIG. 6 relates to the system for locking a guide C in two positions.

The object of the two fixed positions of the retractable arm is to maintain it either in the active position, with the eye 15A in prolongation of the axis of the spindle B during the unwinding of the package 58, or in the withdrawal position for the removal of the tubes (packages exhausted or an end having been broken).

FIG. 6 shows the mounting of an element C and the operation. This figure illustrates the mounting and the free end of the retractable arm in unbroken lines (active position) and also in broken lines the free end of the retractable arm in the withdrawn position.

The element C comprises a base forming a clamp 125 fixedly mounted on one of the horizontal tubes of the frame A with the aid of a cap 126 and bolts. The clamp 125 in the form of a U-shaped member supports on each of its side arms a U-shaped pole piece. These two parallel pole pieces 128A (of soft lamellar iron), one of which is shown, are cast integrally in the clamp 125. At the upper end, a magnet 128B forms the bridge between the said pole pieces, thus establishing the magnetic circuit. The arm 129 is mounted in a ferrule 127, which is pivotally connected at 130 to the clamp 125, which has two lugs for this purpose. A soft iron plate 129A, for example by bolts, to the ferrule 127. In the operative position, the plate 129A rests at its lower face on the lower lips of the two pole pieces 128A. The said plate is magnetically held in position. In the retracted position, the lever 129 having pivoted about the pin 130, the plate 129A rests at its upper face on the upper lips of the pole pieces 128A and is magnetically maintained thereon.

It is to be noted that the mounting of the arm on the tube of the frame can readily be shifted simply by slackening the collar 126, and the eye 15A can thus be moved towards or away from the spindle, whereby the amplitude of the balloon is varied. This is important for adjusting the tension as a function of the mechanical characteristics of the yarns employed. In addition, the speed of each unwinding spindle B is controllable and it is possible, more especially in the case of blended cabled yarns, to give each end the desired twist and tension.

Figure 9:
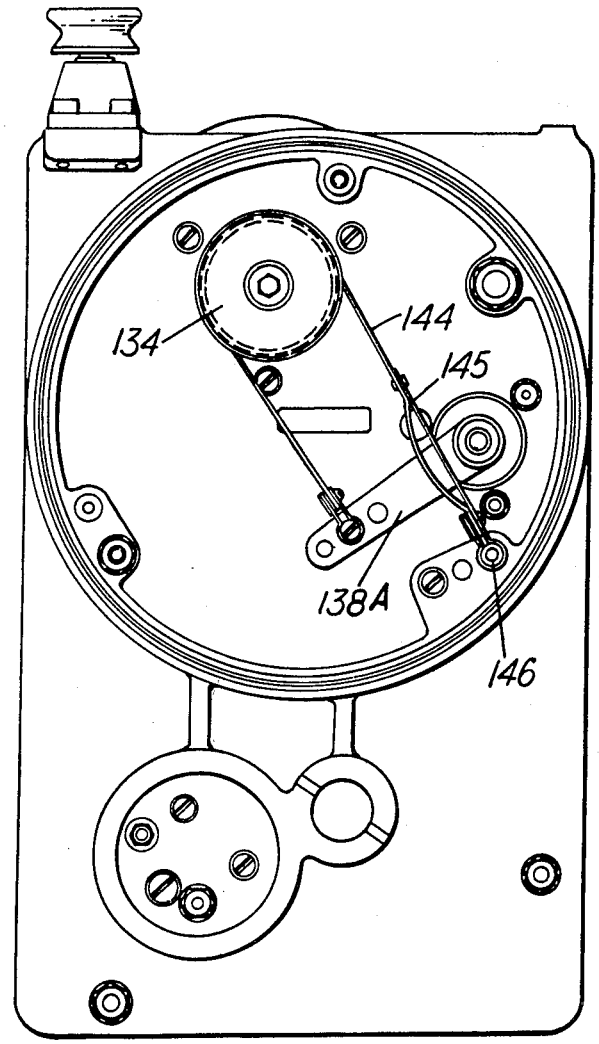
FIG. 9 is a rear elevation of the delivery element.

The three thread ends in the case of a three-ply cabled yarn leaving the guides C converge towards the delivery member D illustrated in FIGS. 7, 8 and 9, the essential object of which is to subject to the cabling action twisted yarns of equal length under the same tension. The delivery member is composed of the support plate 130 fixed to an appropriate point of the frame A. The said plate supports on its two faces guiding and adjusting elements.

On the supply side of the delivery member D is disposed a convergent element (on the inclined bar 8 of FIG. 1) composed of a fixed support 17 and three rollers 18 (of which two are shown, the third being concealed by another in FIG. 1). One of the ends which is to pass close to the delivery member D is guided by a supplementary roller 131 at the top of the support plate 130. The three ends are directed towards the roller 132 and the slightly inclined guide roller 133 associated therewith. The three yarns each envelop this assembly by one or more complete turns. The roller 132 is keyed on a shaft mounted on bearings (not shown) which shaft is provided with a brake drum 134.

On leaving the assembly 132, 133, the three ends pass over a roller 135 with a considerable angle of contact and thereafter over the roller 136 having three grooves for the three ends. From there, they pass separately over three feeler fingers of an electric stop motion 137 of well known type, and also over a second guide roller 136A having three grooves and thereafter they converge towards the guide E to form the external balloon on the take-up spindle F. The roller 135 is mounted on the end of an arm 138 on a pivot 139. The said arm is pulled by a spring 140 attached at one end to the said arm and at the other end to a nut 141. The nut 141 bears on the support plate 130 and cannot turn. It is mounted on a threaded rod 142 extending through and supported by a pivot 143. This system 141, 142, 143 permits adjusting the pull of the spring.

The pivot 139 is pivotally mounted on the plate 130 (FIG. 9) to a second arm 138A, to the end of which there is attached the inextensible brake belt 144 and its elastic portion 145, which, after having passed around the drum 134, is attached at the other end to a fixed point 146. From the aforesaid means, it will be noted that the tension of the yarns in the balloon in the winding device F balances the sum of the tensions on the ends at the inlet to the drum of the delivery device plus that provided by the braking of the latter.

When the tension increases in the balloon of the winding spindle F, the roller 135 is urged upward in FIG. 7, and the arm 138 pivots in the counter-clockwise direction. Thus, the arm 138A also pivots, in the clockwise direction in FIG. 9, and the braking of the drum 134 is reduced, the rotation of the roller 132 becomes freer and the resultant tension on the free yarns decreases. Conversely, in the case of a reduction of the tension in the balloon of the winding spindle F the rotation of the roller 132 becomes less free due to accentuated braking.

The operation of the electric stop motion 137 is of the conventional type and is not described here. In the event of breakage of a yarn it operates and stops the motor driving the spindles D and the spindle F.

After having passed the common balloon guide E, the group of free ends is directed towards the take-up spindle F, which will now be described with reference to FIGS. 1, 10, 11 and 12.

This take-up spindle is designed on the same principle as the unwinding spindles B, but the thread follows an inverse path therein. However, this inverse path and the necessity to wind the cabled yarn positively involves the presence of a number of additional members, the character and operation of which will hereinafter be described with a general reference to the main differences between the spindle F and the spindles B, which are:

(1) The rotation of the take-up spindle must be effected from the spindle shaft through gearing;

(2) the reciprocating movement of the cabled yarn combined with that of the package, which is necessary for filling the bobbin, is obtained by means of a sliding block actuated by a crossed-thread screw, the rotation of which is derived from that of the bobbin. This screw replaces one of the bars of the cage;

(3) The plate on which the bar cage is mounted is held fast for the greater part by the weight of the appropriately positioned gearing whereby the mass of the counterweight is considerably reduced;

(4) A delivery member is disposed on the retractable cross member of the rim in front of the bar cage and is positively controlled by gearing from the spindle shaft; and (5) The plate 48 of the bar cage supports the casings of the shafts on which the gearings are mounted.

It is to be noted that the spindle F has larger dimensions than the spindles B, its take-up bobbin having to receive the sum of the packages of the latter.

Figure 10:
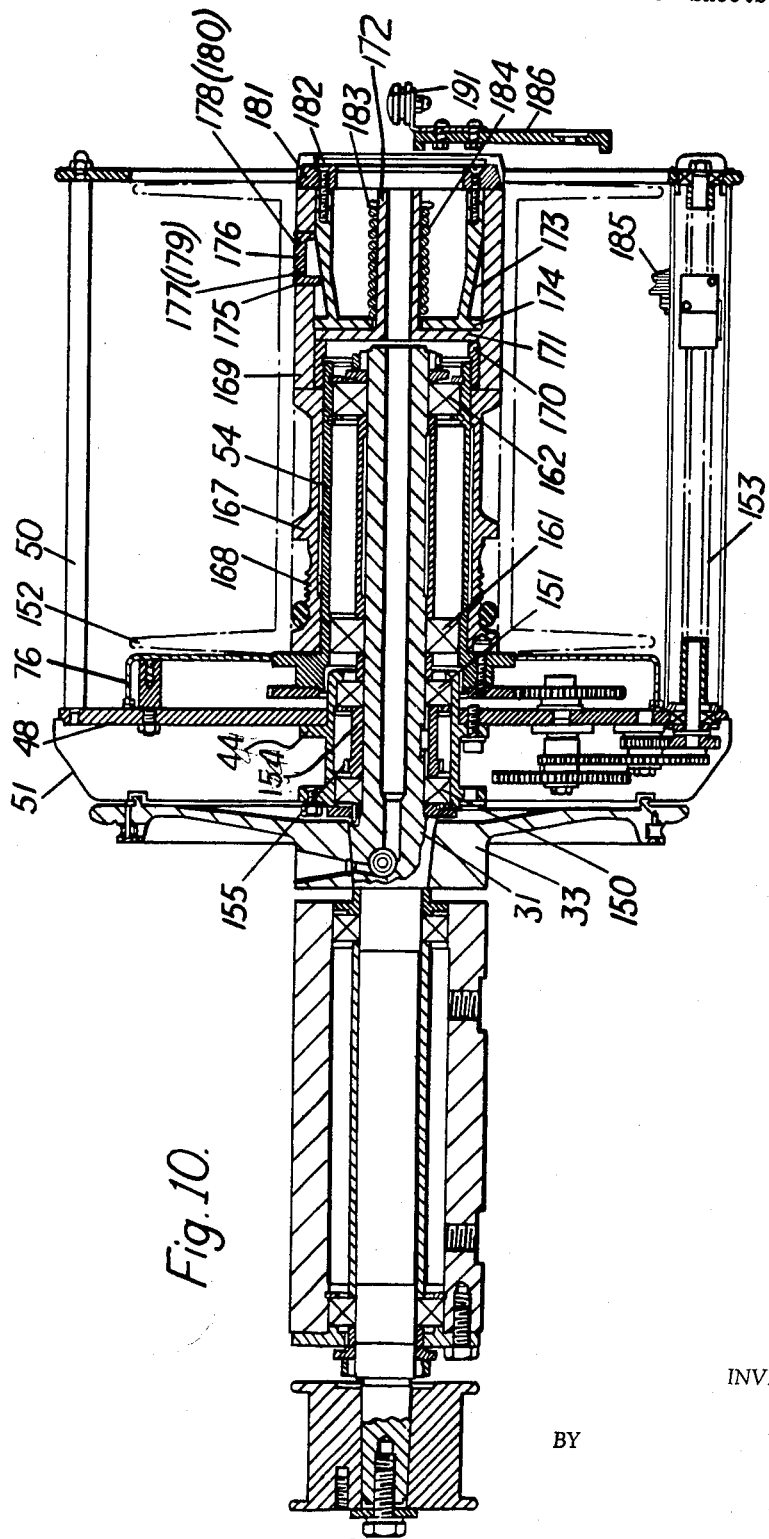
FIG. 10 is a sectional view similar to FIG. 2 showing the take-up spindle.

The manner in which the spindle shaft is driven is identical and will not be further described. That part of the shaft which extends from the bearing, as also the plate 33, are also of the same general form as in the case of spindles B. The casing 44 is mounted on the shaft with the interposition of two bearings 150, 151 (FIG. 10). The said casing 44 supports the plate 48 serving as a base for the bar cage 50 and for the housing 51. As stated above the plate 48 supports a series of gears on its two faces, partly in the rear housing 51 and partly on the other face in the housing 76.

In FIG. 10, the said gearings are not completely shown and their arrangement is more readily apparent from the kinematic chains of FIG. 12. The intermediate sleeve 154 of the two bearings 150, 151 is keyed on the shaft and is designed in the form of a toothed ring at 155. The casing 44 is formed with a recess (not shown) opposite a wide segment of the said ring. The latter, which is driven by the shaft at high speed (for example 6000 revolutions per minute) drives successive reduction pinions 155a, 155b, 155c, 155d, 155e, 155f, the latter being secured to a shaft driving at its other end a delivery member which will be described in detail with reference to FIG. 11. Mounted on the same shaft as the pinion 155e, on the other side of the plate 48, is another pinion 157 driven by a friction member 156, the action of which can be adjusted by the spring.

The dotted lines indicate the meshing of the said pinion 157 with the toothed ring 160 fixed on the profiled sleeve 54 turning on bearings 161, 162. The said sleeve is therefore driven semi-positively only through friction member 156 by the rotation of the shaft of the spindle F. The ring 160 also drives the successive reduction gearings 160a, 160b, 160c, 160d, 160e, 160f and 160g, the last one being keyed on the shaft 158 of the crossed-thread screw 153 for the traversing motion. The number of reciprocating movements therefore bears an absolutely constant ratio to the number of turns of the bobbin 152.

A sleeve 167 of very slightly smaller diameter than the bore in the body of the bobbin is positioned on the profiled sleeve 54. The sleeve 167 has formed in its outer surface a groove 168 having a fluted base (similar to the groove 67 in the spindle B) in which is disposed a resilient retaining and centering ring at the rear of the body of the bobbin 152, another device for centering the bobbin being provided at the front. The profiled sleeve 54 is extended by a hollow cylindrical member 169 of equal external diameter to the sleeve 167 and secured to the head of the profiled sleeve 54 by an intermediate screw threaded sleeve 170 fixed to the hollow member 169.

The said member 169 has at the rear a transverse partition 171 with a central tubular part 172, the axis of which is aligned with that of the bore of the shaft of the spindle F. Slidably engaged in the member 169 is a profiled mandrel comprising a frusto-conical portion 173 between two cylindrical guide portions. Formed in the hollow member 169 are three apertures 175, in each of which there is mounted a shoe 176 of cylindrical external form and frusto-conical internal form, where it bears against the part 173 of the sliding mandrel.

The relative positions of the two members are such that the three shoes 176 project slightly from the hollow member 169. Two annular grooves 177, 178 are formed in the member 169 level with the apertures and the said grooves are extended by grooves of like profile in the shoes. Two resilient rings 179, 180 thus maintain the shoes against the sliding mandrel. The latter is provided at its forward end with a grip ring 181 fixed by screws 182.

In addition there is mounted on the tube 172 a coil spring 184 bearing at one end against the end face 174 of the sliding mandrel and at the other end against a washer 183 secured to the tube 172. Thus, the said mandrel is fully engaged in the hollow member 169 and the shoes 176 project to the maximum extent.

When the mandrel 173 is pulled forward by means of the ring 181, the shoes 176 are withdrawn into the interior of the apertures due to the action of the resilient rings 179, 180. By turning the ring 181 about its own axis after it has been disengaged from the member 169, it is possible to rest it on the latter. It is then sufficient to engage the bobbin, which enters freely. Once it is in position under the action of the rear resilient ring, the ring 181 is so turned as to engage in the member 169. Under the action of the coil spring 184, the mandrel is forced in and the shoes come into contact with the body of the bobbin, thus ensuring perfect centering thereof.

The crossed thread screw 153 which replaces one of the bars 50 is preferably disposed at the bottom of the bar cage as in FIG. 10. It supports a sliding block fixed to a support for the traversing roller 185.

Figure 11:
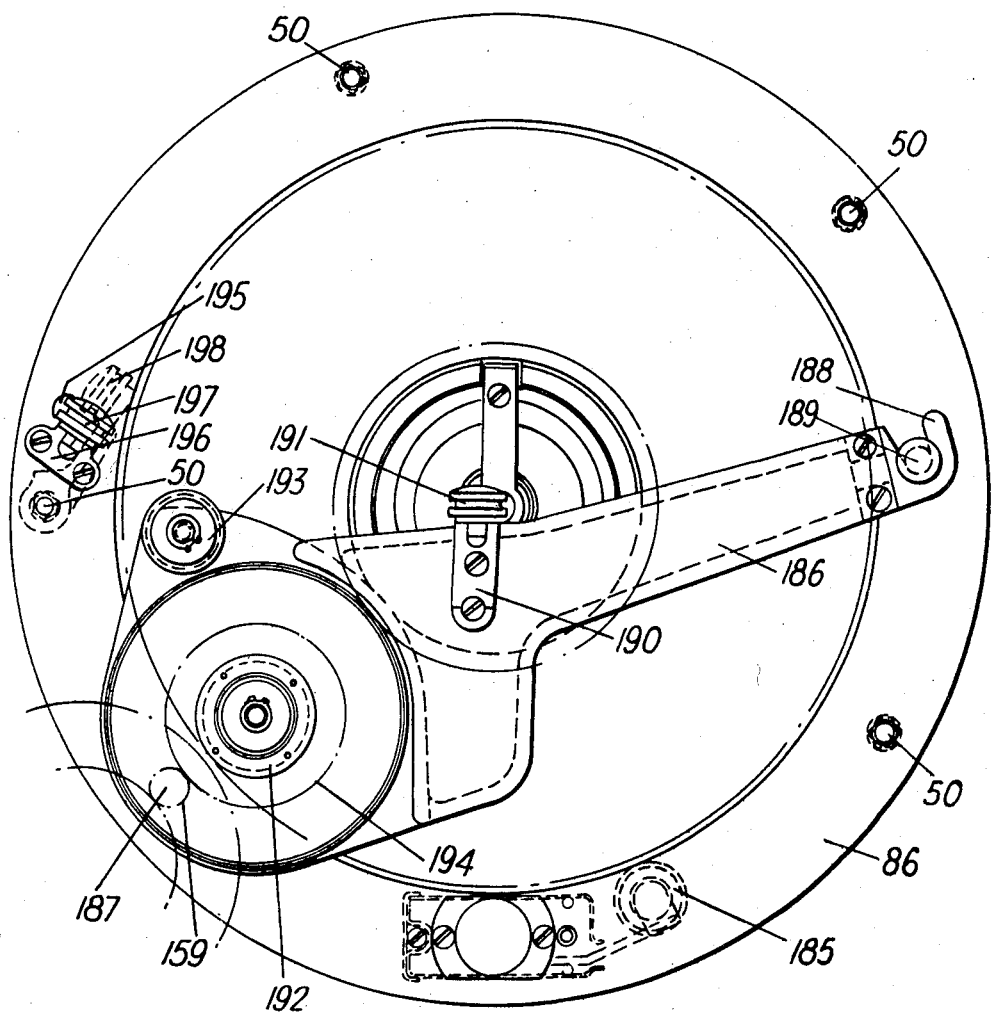
FIG. 11 is a front elevation of a spindle on an enlarged scale.

FIG. 11 is an end view of the take-up spindle with the members for guiding the cabled yarn and a delivery member. Disposed on this end face is a retractible cross member 186 adapted to pivot at 187. The said cross member has on its end a hook 188 for engagement on a stud 189. A spring (not shown) tends to return the stud and ensures the locking. The arm in the retracted position for doffing the bobbin is shown in dotted lines at the bottom and the left of FIG. 11. The cross member 186 supports at its center the support 190 of the roller 191. The said cross member also supports a delivery member comprising a cylinder 192 associated with a grooved roller 193. The said cylinder 192 is centered on and secured to a toothed wheel 194 meshing with the pinion 159 keyed on the end of the transmission shaft, which is driven at the other end by the pinion 155f (see FIG. 12). The ring 86 is formed with a hole 195, close to which a guide roller 197 is mounted on a support 196. Another guide roller 198, shown in broken lines because it is situated behind the ring 86, is fixed on a support mounted on a bar 50.

The group of three twisted yarns coming from the guide E forms an external balloon, and receives a first twist in travelling towards the oblique hole 35, is guided around the central roller 91 into the axial channel 34, in which it receives a second twist, leaves the spindle by way of the tube 172 and is guided around the roller 191 towards the delivery member, where it describes a number of complete turns on the cylinder 192 and the fluted roller 193, the turns being separated by the parallel flutings.

The said delivery member, the speed of which is positively determined by that of the spindle, ensures the speed of travel absolutely necessary for obtaining the desired cabling twist. No slippage occurs. On leaving the delivery member, the cabled yarn passes around the guide roller 197 and through the hole 195 in the ring 86 and is guided tangentially to the bar cage by the roller 198. The cabled yarn successively passes over a plurality of bars 50 so as to reach the roller 185 of the traversing sliding block. The said roller ensures the take-up on the bobbin 152 with traverse imparted by the crossed thread screw 153.

The path followed by the thread is indicated in FIG. 11, as also is the direction of rotation of the bobbin, which is shown by the arrow. The bobbin has a take-up speed which is slightly greater than the speed of the cabled yarn fed by the delivery member. Consequently, under the action of the friction drive of the bobbin, the cabled yarn is placed under slight tension between the delivery member and the bobbin. It is necessary for the output layer of the block constituting the delivery member always to be tensioned in order to avoid slippage. This tension on the delivery side may be adjusted by the friction member 156, as previously explained. The wound package on the bobbin is also formed with the minimum tension.

This is important in the case of cabled yarns of synthetic textiles, with which even high tensions which are momentarily applied are not deleterious, while they are harmful if they are maintained for a very long time, as is the case in the interior of wound packages.

It is to be noted that the gearing on the left side of the center shaft in the machine proper follows a curve so that the gear wheel 157 meshes with the gear wheel 160, although this is shown in FIG. 12 as a development with the gears 157 and 160 out of mesh.

The gearing to the right of the center shaft is not coplanar with the gearing to the left, but is at a small angle as will be clear from a consideration of FIG. 12.

The improved apparatus according to the present invention permits of obtaining high grade cabled yarn formed of two or more ends, of any desired construction, with all textile materials or combinations thereof. The machine may equally well be fed with yarns without pre-twist as with pre-twisted yarns. The production is substantially the same in both cases, since the unwinding spindles can turn more rapidly than the take-up spindle. The various tension compensators and guide members, delivery members and feed members ensure a complete regularity of the cabled yarns and completely satisfactory operation of the equipment, resulting in almost complete absence of breakage and therefore maximum output of the equipment and minimum repairs.

The design of the equipment, based on the use of simple rotatable mechanical elements which can be balanced without difficulty, ensures continuous regular operation with minimum consumption of power.

It has been stated in the beginning of the specification that the described installation represents a unit with its individual motor. It is easy to align batteries of units and the provision of an individual motor for each unit increases the flexibility of operation and results in an improved output of the whole assembly.

It is also to be noted that the noise is reduced by the construction of some of the pinions of reinforced plastic material. The pinions 155b and 155c (see FIG. 12) have been placed in front of the plate 48 so that they are readily accessible and replaceable whereby it is impossible to obtain with the aid of the take-up spindle a considerable range of twists. The friction member 156 is similarly accessible for changing the spring when necessary.

It should also be noted that a suction device (not shown) may be used with the machine to facilitate and reduce the labor involved in passing the thread through the spindles and the convergence eyes.

What is claimed is:

1. A weight arrested double twist spindle comprising a hollow shaft mounted to rotate about a horizontal axis, a sleeve journalled on said shaft and carrying a tube adapted to support a yarn package, said shaft having an eccentric hole disposed beyond said sleeve, a removable cartridge seated in said hole and carrying a rotatable yarn guide disposed axially of said hollow shaft, a hub seated on said shaft having a passage in alignment with said hole, said hub carrying a disc having a peripheral surface, a frustoconical housing seated on said sleeve and located closely adjacent said disc, said housing having a circular closure plate, an annular housing carried by said plate and having a rim engaging said tube, a multibar cage carried by said closure plate coaxially of said shaft, a first yarn guide roller carried by a bar of said cage to receive yarn from said package, a second guide roller carried by another bar of said cage to receive said yarn after passing helically around at least a portion of the periphery of said cage, and a retractable and lockable pivoted arm seated on the free end of said cage and carrying a guide member registering axially with said hollow shaft and adapted to guide the yarn from said first and second guide rollers into said hollow shaft in its path to said cartridge, said yarn being adapted to pass through said cartridge and over the peripheral surface of said disk to form a balloon around said cage.

2. A double twist spindle as set forth in claim 1 in which said pivoted arm is adapted to be retracted in a plane transverse to the axis of said shaft to provide for the insertion of said package, and contacting members on said arm and said cage providing frictional means to locate said arm in operative position.

3. A double twist spindle as set forth in claim 1 in which said cage comprises a plurality of axially extending bars spaced peripherally therearound, said first and second guide rollers are positioned to guide the yarn over at least two successive bars, and a feeler mechanism engages the yarn between said last bars for interrupting the operation of said spindle in response to yarn breakage.

4. A double twist spindle as set forth in claim 3 in which a friction brake is provided to retard the rotation of said sleeve and said feeler mechanism is adapted to apply said brake in response to yarn breakage.

References Cited in the file of this patent

UNITED STATES PATENTS

| | | |
|---|---|---|
| 951,932 | Bebie | Mar. 15, 1910 |
| 2,511,638 | Koella | June 13, 1950 |
| 2,593,984 | Clary et al. | Apr. 22, 1952 |
| 2,729,050 | Honig | Jan. 3, 1956 |
| 2,843,997 | Vibber | July 22, 1958 |

FOREIGN PATENTS

| | | |
|---|---|---|
| 1,062,705 | France | Dec. 9, 1953 |